US008195919B1

(12) United States Patent
Olson et al.

(10) Patent No.: US 8,195,919 B1
(45) Date of Patent: Jun. 5, 2012

(54) HANDLING MULTI-CYCLE INTEGER OPERATIONS FOR A MULTI-THREADED PROCESSOR

(75) Inventors: Christopher H. Olson, Austin, TX (US); Robert T. Golla, Round Rock, TX (US); Manish Shah, Austin, TX (US); Jeffrey S. Brooks, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 515 days.

(21) Appl. No.: 11/927,177

(22) Filed: Oct. 29, 2007

(51) Int. Cl.
*G06F 13/00* (2006.01)

(52) U.S. Cl. ............ 711/220; 711/2; 711/209; 711/219; 711/E12.078

(58) Field of Classification Search .................. None
See application file for complete search history.

(56) References Cited

U.S. PATENT DOCUMENTS

| | | | | |
|---|---|---|---|---|
| 5,233,553 | A * | 8/1993 | Shak et al. ................ | 708/491 |
| 5,577,200 | A * | 11/1996 | Abramson et al. .......... | 714/50 |
| 5,961,580 | A * | 10/1999 | Mahalingaiah .............. | 708/670 |
| 6,446,034 | B1 * | 9/2002 | Egolf ........................... | 703/27 |
| 6,807,616 | B1 * | 10/2004 | McGrath et al. ............ | 711/206 |
| 2003/0023829 | A1 * | 1/2003 | Ishii ............................ | 711/219 |
| 2004/0123066 | A1 * | 6/2004 | Liron et al. ................. | 711/200 |
| 2005/0216697 | A1 * | 9/2005 | Liron et al. ................. | 711/208 |
| 2006/0184738 | A1 * | 8/2006 | Bridges et al. .............. | 711/125 |

OTHER PUBLICATIONS

AMD64 Technology, AMD64 Architecture Programmer's Manual, vol. 1: Application Programming, Sep. 2006, 19 pgs.
AMD64 Technology, AMD64 Architecture Programmer's Manual, vol. 2: System Programming, Sep. 2006, 25 pgs.
AMD64 Architecture Tech Docs, http://www.amd.com/us-en/Processors/TechnicalResources/0,,30_182_739_7044,00.html, 3 pgs., accessed Oct. 29, 2007.

* cited by examiner

*Primary Examiner* — Edward Dudek, Jr.
*Assistant Examiner* — Sean D Rossiter
(74) *Attorney, Agent, or Firm* — Polsinelli Shughart PC

(57) ABSTRACT

Determining an effective address of a memory with a three-operand add operation in single execution cycle of a multi-threaded processor that can access both segmented memory and non-segmented memory. During that cycle, the processor determines whether a memory segment base is zero. If the segment base is zero, the processor can access a memory location at the effective address without adding the segment base. If the segment base is not zero, such as when executing legacy code, the processor consumes another cycle to add the segment base to the effective address. Similarly, the processor consumes another cycle if the effective address or the linear address is misaligned. An integer execution unit that performs the three-operand add using a carry-save adder coupled to a carry look-ahead adder. If the segment base is not zero, the effective address is fed back through the integer execution unit to add the segment base.

19 Claims, 3 Drawing Sheets

HANDLING MULTI-CYCLE INTEGER OPERATIONS FOR A MULTI-THREADED PROCESSOR

FIELD OF ART

The present invention is generally directed to integer operations for multi-threaded processor, and more particularly, but not exclusively, to memory address calculation for a multi-threaded processor that supports software that is compatible with x86 processors.

BACKGROUND

Computer memory can be addressed in multiple ways. One model is sometimes referred to as a flat model, in which the memory is considered a single block, or segment, of memory locations. The segment is generally treated as a single long line of memory locations. When a processor accesses a memory location, the processor generally uses an offset from the beginning of the segment to address the desired memory location. The offset is often referred to as an effective address. The processor then reads or writes to a specified number of memory locations starting from the offset address (from the effective address).

Another memory model uses multiple segments. In that case, the processor uses a segment identifier, along with the offset, to address a desired memory location. Under that model, the address of a certain location in a certain segment is generally referred to as the logical address. Older software is often based on logical addresses for multiple segments of memory. Newer software is often based on the flat memory model. It is desirable for a processor to support both models so that older and newer software can run on the processor.

One way to support both models is to define a memory address as a segment base address plus the effective address, but set the segment base address to zero when the processor is executing software that is based on the flat model. X86 processors generally provide this support. These processors generally refer to the resulting memory address as the linear address. Note that the terms "linear address" and "logical address" generally define the same calculation for a memory address, but the term "linear address" is used herein, because the segment base address can be zero. However, this method requires adding the segment base address for every address calculation.

The speed of loading or storing data depends on the speed of calculating the linear address. In current x86 processors, the linear address is determined by adding the segment base address as an operand to operands of the effective address. Thus, even when the segment base operand is zero (e.g., when newer software is executed), the segment base operand takes up computing resources, and slows determination of a linear address.

This is exacerbated if a memory misalign occurs when trying to access a set of memory locations that wrap from one memory line to another memory line. In that case, two addresses must be calculated. It is desirable to provide a processor that supports older software, but minimizes the time and resources needed to determine memory addresses and to handle memory misaligns.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Figure 1:
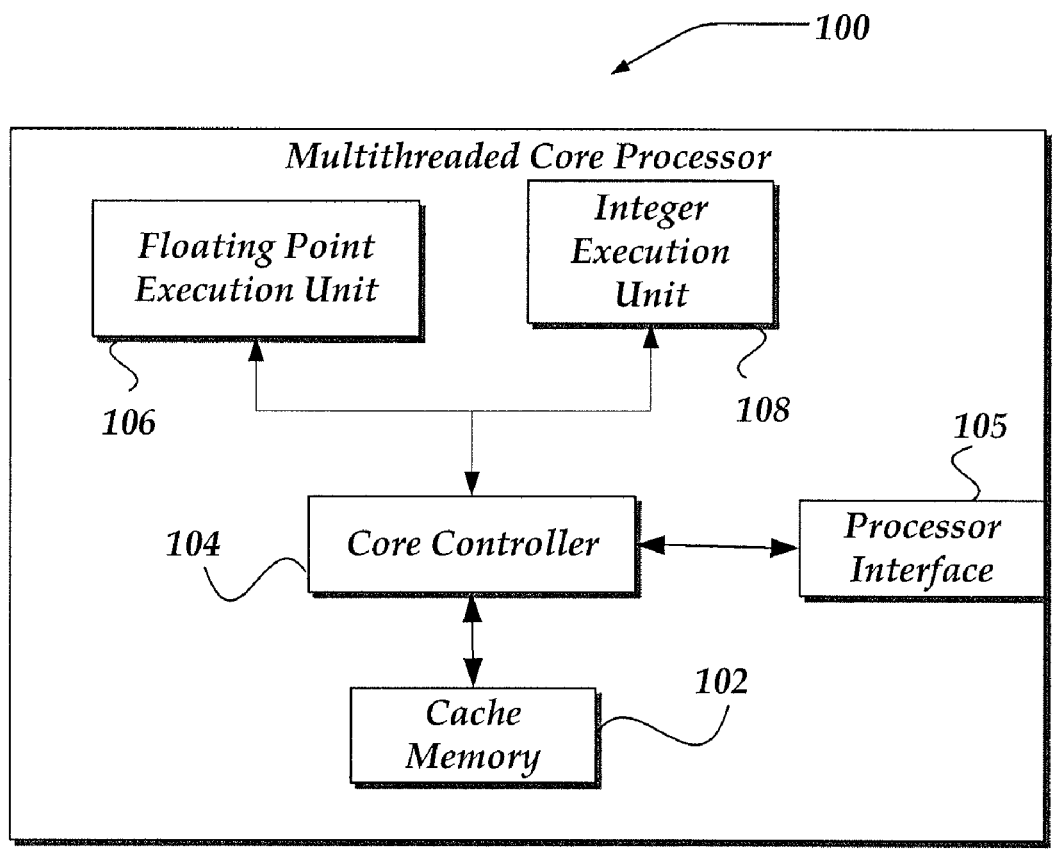
FIG. 1 shows a functional block diagram illustrating one embodiment of an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, processes, or devices. Accordingly, the present invention may take the form of an entirely hardware embodiment, an entirely software method embodiment or an embodiment combining software and hardware aspects. Also, hardware may include digital hardware, analog hardware, and or combinations of digital and analog hardware. The following detailed description is, therefore, not to be taken in a limiting sense.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part on," and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The phrase "in one embodiment," as used herein does not necessarily refer to the same embodiment, although it may.

Briefly stated, the invention determines a memory address. Processor embodiments calculate an effective address with a three-operand add operation in single processor cycle. In parallel, during that same processor cycle, the processor determines whether a segment base is zero. If the segment base is zero, the processor can access a memory location at the effective address without further address calculation. Processors can generally perform the parallel three-operand add operation and the determination, faster than a four-operand add operation. Thus, processors can generally calculate a memory address faster, because most of the addresses will be needed for newer software based on a single segment. For those occasions when the processor is instructed to execute legacy software based on multiple segments of memory, the processor will determine that the segment base is not zero. On those occasions, the processor can consume another cycle to add the segment base to the effective address. Similarly, the processor will consume another cycle if the address is misaligned, which occurs if the desired memory locations cross from one 8-byte block to another 8-byte block.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. Conversely, additional components may be include as known in the art. This example embodiment illustrates a multithreaded core processor 100 of a central processing unit (CPU). Core processor 100 generally comprises a number of integrated circuit elements, including registers, logic gates, flip-flops, multiplexers, buses, a clock, and the like. The integrated circuit elements are generally arranged into various components for certain functions. For example, memory circuits of core processor 100 generally form a cache memory 102, which generally comprises an instruction cache and a data cache. Cache memory 102 may comprise an L1 cache and/or an L2 cache. The cache memory is coupled to a core controller 104, which generally coordinates operations of core processor 100. Core controller 104 may include an instruction issue unit, an advanced programmable interrupt controller, storage registers, and/or other components. The core controller may also include or be coupled to a processor interface 105, for communicating with other devices, and/or include or be coupled to a floating point execution unit 106.

Similarly, the core controller may also include or be coupled to an integer execution unit 108. In a multithreaded core, the integer unit is a shared resource. As a shared resource, it is desirable that the integer unit sustain an execution of one operation per cycle to achieve reasonable performance. For chip area efficiency, the integer unit is used to compute load and store addresses.

Address computation by current X86 processors presents two complications for a single cycle integer unit. First, to support legacy software based on multiple segments, computing the linear address requires the addition of four operands:

linear address=segment base+base+(index*scale)+ displacement;

(where scale={1, 2, 4, 8})
In other terms, the linear address is the segment base plus the effective address, where:

effective address=base+(index*scale)+displacement;

(where scale={1, 2, 4, 8})
The linear address is used to access memory. At higher frequencies, the four-operand add is difficult to implement in a single cycle.

Secondly, current x86 architecture requires support for misaligned access operations (e.g., load or store operations). In other words, the processor may have to use two execution cycles to access some groups of memory locations that are not contiguous. Typically, a segment is comprised of multiple lines of memory. If a memory access operation requires the processor to access some memory locations beyond one line, the processor must access memory locations at the end of one line and at the beginning of a next line. These are sometimes referred to as wrapped locations. When accessing a wrapped location, a processor generally requires at least two execution cycles to determine that address of the portion at the end of one line, and to determine the address of the remaining portion at the beginning of the next line. The integer execution unit generates these two addresses in successive cycles for misaligned addresses. Subsequently, two cache accesses are used to actually access the memory locations.

To ensure that memory access operation will access all of the memory locations needed by the operation, x86 processors typically always determine whether a misalign exists before actually performing the memory accesses. This determination can be calculated based on the number of bytes to be accessed and the starting memory location (e.g., to be loaded or stored). For example, if eight bytes are to be accessed (i.e., the size of memory to be accessed is eight bytes), the processor can determine whether the address of that eighth byte will exceed the address of the last memory location in one line. More specifically, the processor can perform a logical AND operation with the size of memory to be accessed and the linear address. If the result is greater than an address value that is eight bytes before the end of a line, then a misalign exists. Thus, an address value that is one byte less than the memory access size is a misalign threshold address. Or if only 2 bytes are to be accessed, the processor can determine whether the result is equal to the last address in a line. Of course, a misalign can not occur when only one byte is to be accessed. The following code is an example summary of a misalign determination:

misalign=(size_8 byte&(linear_address[2:0] >3'b000))|

(size_4 byte&(linear_address[2:0]>3'b100))|

(size_2 byte&(linear_address[2:0]==3'b111));

//size_1 byte misalignment is not possible

Checking for misalign, and adding the segment base operand into linear address calculations, uses computing resources and time. This reduces processor performance. Embodiments of the present invention check for misalignment after the first address is already sent to memory, and add a segment base only when needed.

Figure 2:
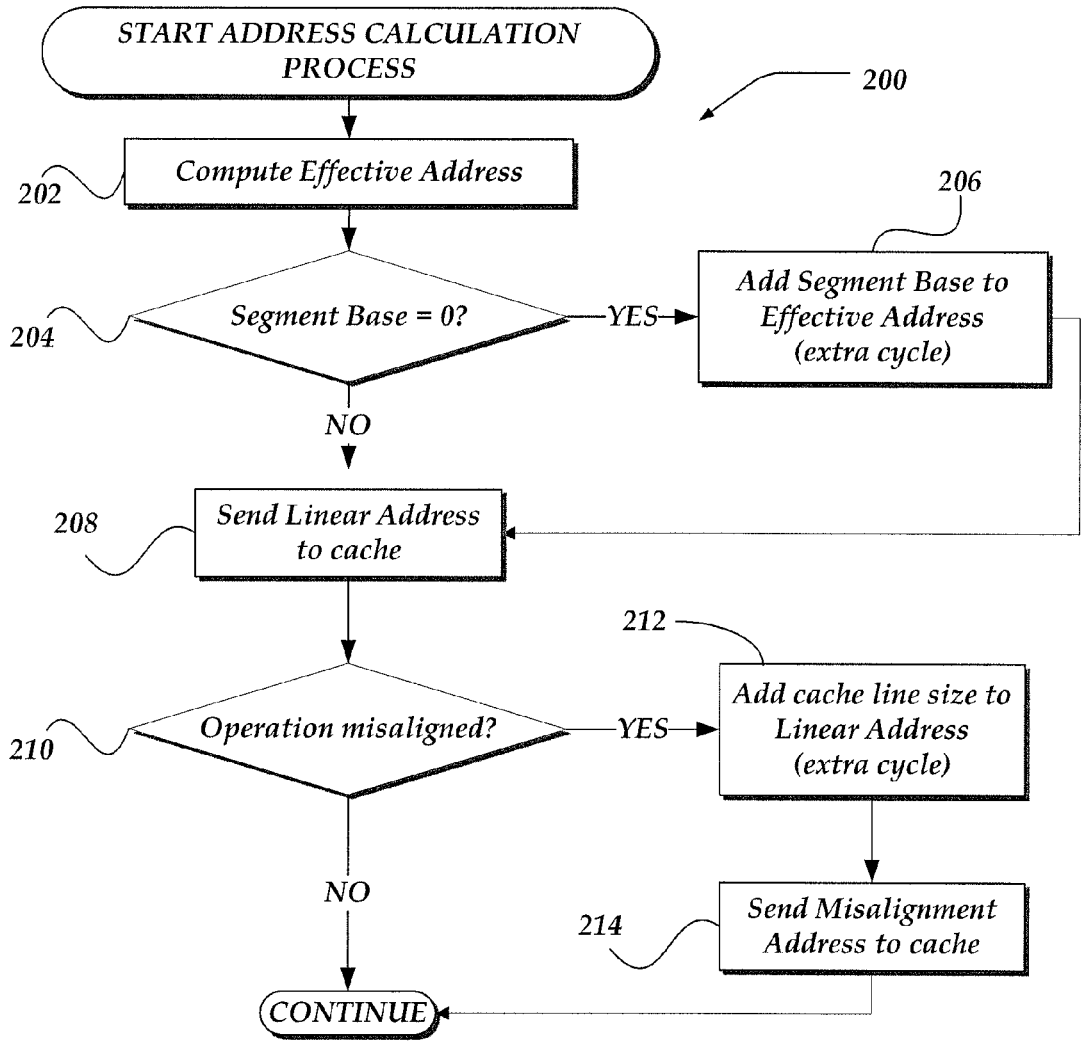
FIG. 2 illustrates a logical flow diagram generally showing one embodiment of a process for accessing memory.

FIG. 2 illustrates a logical flow diagram generally showing a process 200 for accessing memory according to one embodiment of the present invention. At an operation 202, the integer unit computes the effective address by a three operand add operation. In parallel with the three-operand add, the integer unit checks the segment base at a decision operation 204, to see if the segment base is zero. If the segment base is zero, no stall of the issue unit is required. If the segment base is non-zero, the integer unit stalls the issue unit for an additional cycle. During this second cycle, the instruction unit adds the initially computed effective address to the segment base, at an operation 206. In either case, the core controller sends the calculated address to the cache at an operation 208.

At an operation 210, the integer unit checks the address for misalignment. If a misaligned access is detected, the integer unit will stall the issue unit for an additional cycle. During this cycle, at an operation 212, the integer unit generates the misaligned address needed for the misaligned portion of memory that needs to be accessed. In one embodiment, when the first linear address is calculated, the second linear address is calculated as follows:

2nd linear address={1st linear address[63:3],3'b000}+ 4'b1000;

At an operation 214, the core controller sends the second linear address to the cache.

Figure 3:
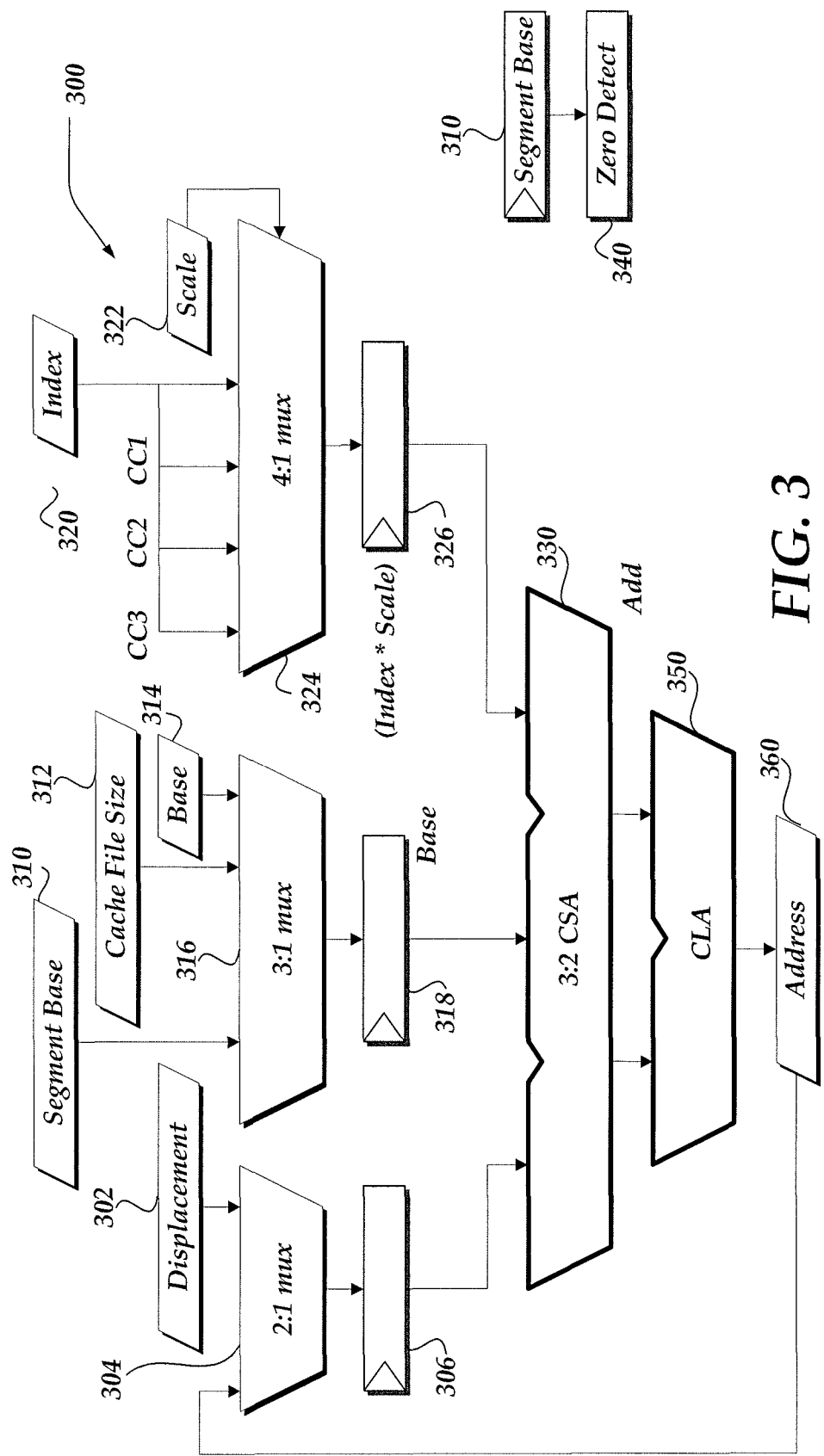
FIG. 3 is an address calculator according to aspects of the present invention.

FIG. 3 provides further detail in an address calculator 300 according to aspects of the present invention. During a preparation cycle, the processor performs a number of shift operations to prepare address operands. In existing x86 processors this preparation cycle occurs, but that preparation cycle simply obtains the following operands: segment base, displacement, base, index, and scale. Following the preparation cycle is an execution cycle that computes the address. In existing x86 processors, this execution cycle performs multiple operations, including shifting the index value by the scale value. During the execution cycle, existing x86 processors also add the segment, displacement, and base operands together with the shifted index value to produce a linear address. Thus, existing x86 processors perform a four-operand add during the execution cycle.

Embodiments of the present invention push some processing back into the preparation cycle, and then perform only a three-operand add during the execution cycle. Specifically, during the preparation cycle, a displacement operand 302 is processed by a displacement multiplexer 304, which may be a shifter, multiplier, or other type of multiplexer component. Multiplexer 304 receives two input operands and produces one output operand. The first input to the multiplexer 304 is the displacement and the second input is address feedback. The second input operand initially does not affect the operation since it's not selected. As discussed below, if the segment base is non-zero, or if a misalign occurs, the second input operand will be the initial effective address, or the initial linear address (depending on whether the loop back is caused by a non-zero segment base or a misalignment). The output of displacement multiplexer 304 is a multiplexed displacement operand 306.

Similarly, a segment base operand 310, a cache file size operand 312, and a base operand 314 are multiplexed together by a base multiplexer 316. The output of base multiplexer 316 is a multiplexed base operand 318. An index operand 320, and corresponding index operands determined over three prior clock cycles (CCs), are scaled by a scale operand 322, using an index multiplexer 324. The output of index multiplexer 324 is a multiplexed index operand 326.

After the preparation cycle, a first execution cycle occurs in which the three multiplexed operands are added together with a carry-save adder (CSA) 330 of the integer execution unit to produce two intermediate outputs. During the same first execution cycle, the two intermediate outputs of CSA 330 are added by a 64-bit carry look-ahead adder (CLA) 350. The output of CLA 350 is address 360, which is the effective address after the first execution cycle. This three-operand add process enables faster address calculation than prior four-operand adds that included the segment base in the execution cycle. Instead, processors according to the present invention check the segment base in parallel with the three-operand add, during the same first execution cycle. More specifically, the processor determines whether segment base 310 is zero, and sets a flag accordingly in a zero detect register 340. If the segment base is zero, the integer execution unit does not instruct the issue unit to stall. The value of address 360 (the effective address) is communicated to the cache to access the data at the calculate address.

However, if the segment base is not zero, the integer execution unit instructs the issue unit to stall. The value of address 360 is fed back to displacement multiplexer 304. Immediately following the first execution cycle, a second execution cycle occurs in which CSA 330 and CLA 350 add the segment base to the effective address to produce the appropriate linear address.

Similarly, an additional execution cycle is performed if a misalign occurs. A misalign may occur after the first execution cycle in which the effective address is calculated. Separate circuitry evaluates the effective address and the size of memory to be accessed, to determine misalignment as discussed above. If the segment base is zero, only the second execution cycle is needed to calculate the misaligned address. However, if the segment base is not zero, the linear address is calculated in the second execution cycle, so a third execution cycle is needed to calculate the misaligned address. This third cycle generally occurs immediately following the second execution cycle.

Thus, a single address computation may loop in the "single cycle" integer unit up to two additional cycles. Because the segment base is typically always zero in newer software (e.g., 64-bit code), a stall of two additional cycles generally only occurs for legacy code (e.g., 32-bit code or 16-bit code). Misalignment can still happen in newer software (e.g., 64-bit code), but misalignment with newer software will only cause one additional cycle, and misalignment is not a common case with newer software.

The approach described above removes one operand from the critical address computation and eliminates the need to involve microcode in all load/store address computations. This approach allows the common load/store address case to execute in a single cycle in the integer unit, in most cases. For non-zero segment bases or misaligned addresses, the issue unit is stalled as required, up to two additional cycles, to complete the calculations for the current thread. This allows multiple threads to issue to the integer unit with a minimum amount of queuing delay.

The above specification, examples and data provide a description of the method and applications, and use of the invention. Since many embodiments of the invention can be made without departing from the spirit and scope of the invention, this specification merely set forth some of the many possible embodiments for the invention.

What is claimed as new and desired to be protected by Letters Patent is:

1. A multi-threaded processor comprising:
    a memory;
    a processor core coupled to the memory and configured to access a memory location that is addressed by a memory segment base, and configured to access a memory location that is not addressed by a memory segment base, wherein the processor core includes an address calculator configured to perform a plurality of operations during a first execution cycle, the first execution cycle being the time required to perform a three-operand add by the processor, including:
    perform a three-operand add to calculate an effective address in the memory based on a displacement operand, a base operand, and a scaled index operand; and
    parallel to the effective address calculation, during the first execution cycle, determine whether the memory segment base is zero.

2. The multi-threaded processor of claim 1, wherein the address calculator is further configured to perform a plurality of operations in a second execution cycle immediately following the first execution cycle, including one of the following:
    calculate a linear address based on the effective address and the memory segment base, if the memory segment base is not zero; and calculate a misalign address based on the effective address, if the memory segment base is zero.

3. The multi-threaded processor of claim 2, wherein the address calculator is further configured to perform a plurality of operations in a third execution cycle immediately following the second execution cycle, including calculate a misalign address based on the linear address if the memory segment base is not zero.

4. The multi-threaded processor of claim 3, wherein the processor core is configured to determine a misalign by determining that a size of memory to be accessed corresponds to accessing a memory address beyond a last memory location in a line of the memory.

5. The multi-threaded processor of claim 2, wherein calculating the linear address includes:
providing the effective address to a displacement multiplexer, which provides the effective address to a carry-save adder;
providing the segment base operand to a base multiplexer, which provides the segment base operand to the carry-save adder; and
adding the effective address to the segment base operand with the carry—save adder and a carry look-ahead adder that is coupled to the carry—save adder.

6. The multi-threaded processor of claim 1, wherein the address calculator comprises a carry-save adder coupled to a carry look-ahead adder.

7. The multi-threaded processor of claim 1, wherein the processor core is further configured to perform a plurality of operations during a preliminary cycle prior to the first execution cycle, including:
multiplex the base with a cache file size; and
multiplex an index with a scale to produce the scaled index operand.

8. The multi-threaded processor of claim 1, wherein the processor core is configured to processes 64-bit code and 32-bit code.

9. A method for accessing a memory address, comprising:
calculating, during a first execution cycle of a processor, an effective address with a three-operand add based on a displacement operand, a base operand, and a scaled index operand, the execution cycle being the time required to perform the three-operand add;
parallel to the effective address calculation, determining, during the first execution cycle of the processor, whether a memory segment base is zero; and
accessing, during a subsequent execution cycle of the processor, a memory location at the effective address if the memory segment base is zero.

10. The method of claim 9, further comprising:
calculating, during a second execution cycle of the processor, a linear address based on the effective address and the memory segment base, if the memory segment base is not zero; and
accessing, during a subsequent execution cycle of the processor, a memory location at the linear address, if the memory segment base is not zero.

11. The method of claim 10, further comprising calculating, during a third execution cycle of the processor, a misalign address based on the linear address, if the memory segment base is not zero, and if the linear address is misaligned.

12. The method of claim 11, further comprising:
determining a memory access size comprising a number of bytes to be accessed;
determining a misalign threshold address of a memory location that is one byte less than the memory access size from an end of a memory line; and
determining that the linear address identifies a memory location in the memory line that is at least as close to the end of the memory line as the misalign threshold address.

13. The method of claim 9, further comprising calculating, during a second execution cycle of the processor, a misalign address based on the effective address, if the memory segment base is zero, and if the effective address is misaligned.

14. The method of claim 9, further comprising:
multiplexing the base with a cache file size, during a preliminary execution cycle prior to the first execution cycle of the processor; and
multiplex an index with a scale to produce the scaled index, during the preliminary execution cycle prior to the first execution cycle of the processor.

15. A computing system comprising:
a memory; and
a multithreaded processor in communication with the memory and configured to perform a plurality of operations during a first execution cycle, the first execution cycle being the time required to perform a three-operand add by an integer execution unit of the multithreaded processor, including:
perform a three-operand add to calculate an effective address in the memory based on a displacement operand, a base operand, and a scaled index operand; and
parallel to the effective address calculation, during the first execution cycle, determine whether a memory segment base is zero for the memory.

16. The computing system of claim 15, wherein the multithreaded processor is further configured to calculate, during a second execution cycle of the integer execution unit, a linear address based on the effective address and the memory segment base, if the memory segment base is not zero for the memory.

17. The computing system of claim 16, wherein the multithreaded processor is further configured to determine a misalign during a third execution cycle of the integer execution unit, by determining that a size of memory to be accessed corresponds to accessing a memory address beyond a last memory location in a line of the memory.

18. The computing system of claim 15, wherein the scaled index operand is determined during a preliminary execution cycle, prior to the single execution cycle, based on multiplexing an index operand and a scale operand.

19. The computing system of claim 15, wherein the processor selectably executes 64-bit code and 32-bit code.

* * * * *